(No Model.)
G. H. SMITH.
COPYING APPARATUS.
No. 401,762. Patented Apr. 23, 1889.
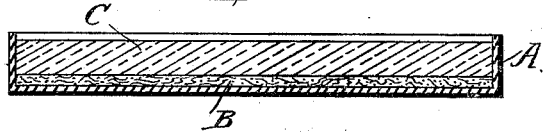

UNITED STATES PATENT OFFICE.

GEORGE HENRY SMITH, OF LONDON, COUNTY OF MIDDLESEX, ENGLAND.

COPYING APPARATUS.

SPECIFICATION forming part of Letters Patent No. 401,762, dated April 23, 1889.

Application filed August 13, 1888. Serial No. 282,637. (No model.) Patented in England May 14, 1888, No. 7,149.

*To all whom it may concern:*

Be it known that I, GEORGE HENRY SMITH, a subject of the Queen of Great Britain, residing at London, in the county of Middlesex, England, have invented certain new and useful Improvements in Apparatus for Producing Manifold Copies, (for which I have obtained a patent in Great Britain, No. 7,149, bearing date May 14, 1888,) of which the following is a specification.

My invention relates to improvements in apparatus for producing manifold copies of writing and analogous matter; and the objects of my improvement are, first, to obtain sharper and clearer copies than have hitherto been obtained with manifold-copiers, and, secondly, to facilitate the removal of the negative from the slab after use. I attain these ends by making the composition of the slab and of the writing-ink in the manner hereinafter described.

In the drawings, Figure 1 is a plan view from above of a tray containing the novel composition, and Fig. 2 is a cross-section through the same.

Manifold copies are now commonly produced by transferring writing from an ordinary sheet of paper to a slab, which is generally composed of a mixture of gelatine, glycerine, and water. Slabs formed of this composition have the disadvantage that the aniline inks which are usually employed sink into the substance of the slab, causing the lines to become blurred and thickened after a few copies have been taken, and also rendering it difficult to clean the slab without the use of warm water, which is liable to make the surface uneven and render remelting necessary. Another gelatine process, which cannot be washed off, must remain for two days in order to allow the negative to sink below the surface. After a few times using, the slab thereby becomes stained and the paper consequently soiled.

According to my invention I make the slab of a composition of china-clay, starch, glycerine, and water, in the following proportions: china-clay, forty-five parts; starch, fifteen parts; glycerine, thirty parts; water, ten parts. This composition is molded into trays of tin, zinc, or other suitable metal or material. In the bottom of the tray is placed a thick sheet of card-board, felt, or any other absorbent material, to take up the superfluous moisture, and thus render the slab ready for use in a day or two after it is made.

Instead of molding the slab in a tray, it may be formed on a pad of wood, paper, linen, or other absorbent material by coating the surface of the said pad.

In the accompanying drawings, A is the tray. B is the sheet of absorbent material in the bottom of the tray, and C is the composition.

To facilitate coating these pads, I make the composition sufficiently fluid to be floated on the surface of the said pads by adding to the composition a greater percentage of water than is given in the hereinbefore-mentioned formula; but obviously greater time must be allowed for the superfluous moisture to evaporate before the pads or slabs are ready for use.

The ink I use is composed of a hydrochloric acid, spirits of wine, water, and aniline, in the following proportions: For blue-black ink: hydrochloric acid, five parts; spirits of wine, ten parts; water, forty parts; green aniline, forty parts; magenta aniline, five parts. For green ink: hydrochloric acid, ten parts; spirits of wine, ten parts; water, forty parts; green aniline, forty parts.

Manifold copies are produced in the following manner: The writing or other matter to be manifolded is written with the ink hereinabove described on a sheet of ordinary paper, and when the ink is dry the said paper is laid face downward on the prepared slab, where it is allowed to remain for a few seconds. It is then removed, and the copies are then taken off by simply laying on sheets of ordinary paper and subjecting them to slight pressure by passing the hand over them.

It will be found that the ink only penetrates very slightly into the composition forming the slab, so that the lines of the negative remain fine and sharp for days, and also that the writing or other matter can easily and readily be wiped off the slab by merely sponging it with cold water, after which the slab is immediately ready to receive a fresh transfer, thus avoiding the vexatious delay experienced in using other dry processes.

I would have it understood that I do not limit myself to the exact ingredients of the composition or ink hereinabove set forth, or to the exact proportions thereof, but hold myself at liberty to use such equivalent materials, acting in the same manner, or proportions thereof, as fairly fall within the spirit and scope of my invention.

What I claim, and desire to secure by Letters Patent of the United States, is—

1. The hereinbefore-described composition of matter to be used for a slab or pad for taking manifold copies of writing or other analogous matter, consisting of china-clay, starch, glycerine, and water.

2. The combination, with a back plate of absorbent material, of a composition consisting of china-clay, starch, glycerine, and water mounted on said plate, substantially as and for the purpose set forth.

3. The combination, with a retaining-tray, of a layer of absorbent material in the tray, and a composition consisting of china-clay, starch, glycerine, and water above the said absorbent material, substantially as and for the purpose set forth.

In witness whereof I have hereunto signed my name in the presence of two subscribing witnesses.

GEORGE HENRY SMITH.

Witnesses:
 ROBT. ED. PHILLIPS,
 WALTER J. SKERTEN.